United States Patent Office 2,871,726
Patented Feb. 3, 1959

2,871,726

PLANETARY TRANSMISSION

Igor Kamlukin, Milwaukee, Wis., assignor to Allis-Chalmers Manufacturing Company, Milwaukee, Wis.

Application October 20, 1954, Serial No. 463,561

3 Claims. (Cl. 74—769)

This invention relates to change speed transmissions, and it is concerned more particularly with a planetary type change speed transmission for heavy duty use as in tractors.

Today, with many hauling and off-the-road vehicles, it is desirable that the vehicle be provided with a transmission having a large number of available speed ratios in a given direction in order that the vehicle may be used under widely diversified ground surface and operating conditions. It is also desirable that these different speed ratios be obtainable smoothly and quickly without stopping the vehicle in order that the momentum of the vehicle may be retained as much as possible. In these respects conventional shiftable gear type transmissions as heretofore used in tractors have not been entirely satisfactory mainly because of the difficulty of synchronizing relatively heavy gear masses for proper mesh.

Practical requirements also make it desirable that the size and weight of the transmission be reduced as much as possible. While the vehicle may require a wide range of different speed ratios for maximum ease of handling under all conditions, in many instances, the vehicle is of a moderate size adding to its versatility. A transmission for this type of vehicle should therefore be small and compact in addition to being capable of affording a large number of operating speed ratios.

For industrial and farm vehicles it is further desirable to provide a transmission which not only affords a relatively large number of speed ratios for forward drive but also an equal number of speed ratios for reverse drive, and wherein the speed ratios and the directions of vehicle travel can be selected independently of each other.

Generally, it is an object of this invention to provide an improved change speed transmission which will take care of the hereinbefore outlined requirements in a practical and fully satisfactory manner.

More specifically, it is an object of this invention to provide an improved planetary transmission wherein a number of planetary gear trains are compounded to afford a number of available speed ratios which is greater than the number of individual planetary gear sets, and wherein all speed ratio changes are made by selective operation of clutches and brakes within the transmission.

Another object of this invention is to provide a planetary transmission of the hereinbefore outlined character wherein the number of available speed ratios, which are different from unity, will be twice the number of planetary gear sets in the transmission, and wherein the whole planetary system may be caused to rotate as a unit for direct drive.

A further object of this invention is to provide an improved transmission of the hereinabove outlined character which will be relatively simple and compact, which lends itself to manufacture at relatively low cost, and which will operate efficiently and without failure under severe operating conditions.

The foregoing and other objects and advantages are attained by the present invention, various novel features of which will become apparent as the following specification is read in conjunction with the accompanying drawings wherein.

Figure 1:
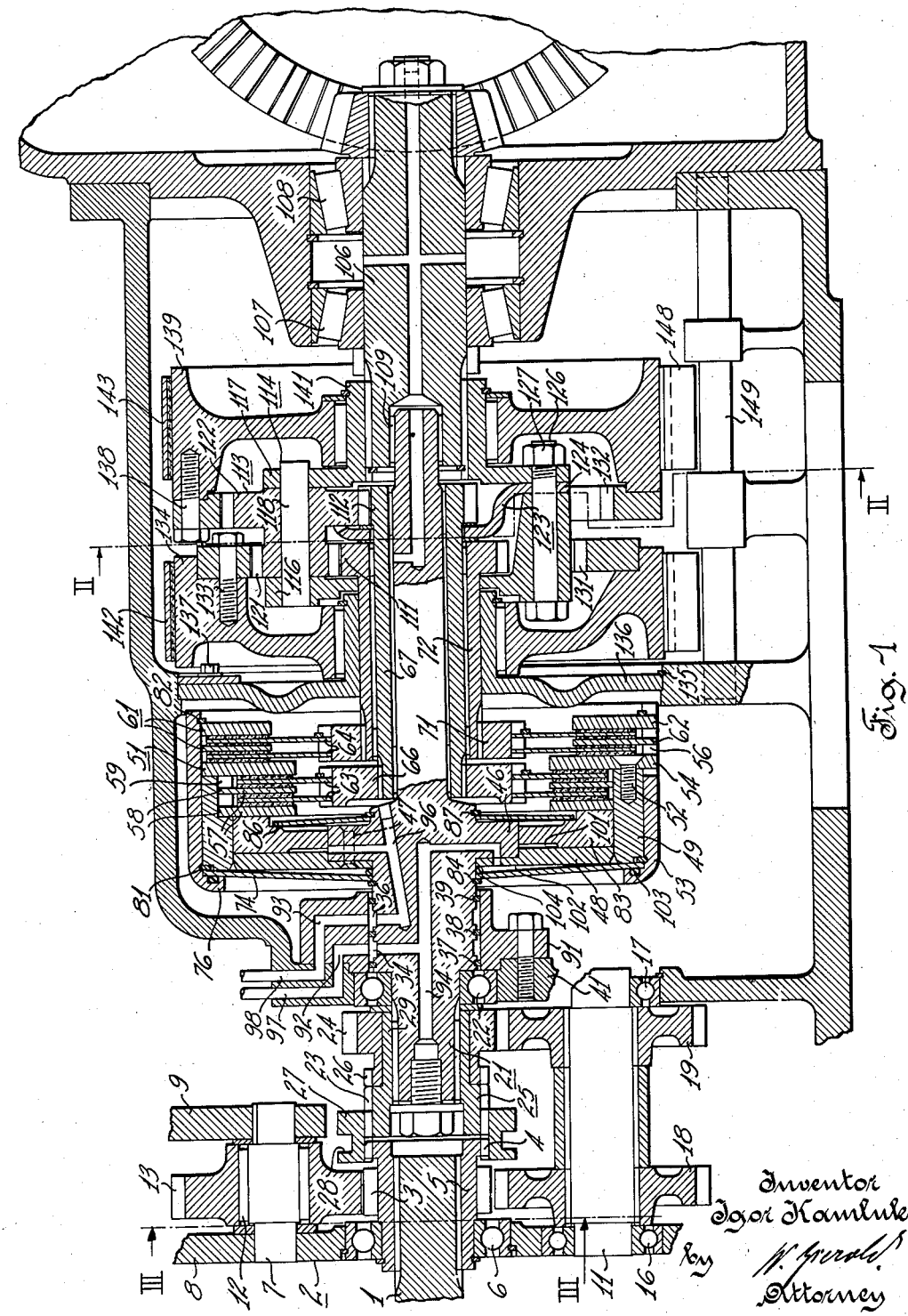
Fig. 1 is a vertical longitudinal section of a planetary type change speed transmission.

Referring to Fig. 1, a drive shaft 1 is connectable in conventional manner with the engine clutch (not shown) of a motor vehicle and has a rearward end portion extending into a forward compartment of a transmission housing generally shown at 2. The rear end of the drive shaft 1 projects into and is spline connected with a combined driving gear and clutch sleeve 5 having a spur gear section 3 and a circumferential series of external clutch teeth 4 at its rear end. Sleeve 5 is rotatably supported at its forward end within the housing 2 in bearing 6, and in this manner rotatably supports the rear end of drive shaft 1.

Figure 3:
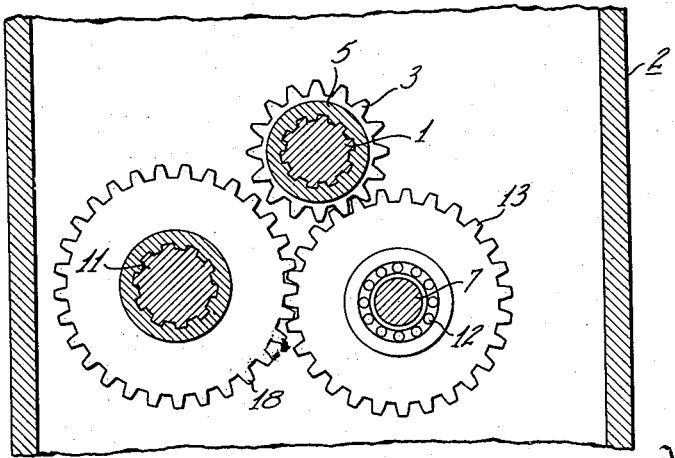
Fig. 3 is a vertical transverse section taken along the line III—III of Fig. 1 showing the relative location of the drive shaft and a pair of counter shafts in the transmission.

As can be seen in Figs. 1 and 3, below drive shaft 1 and transversely spaced from each other are two counter shafts 7 and 11 parallel to the drive shaft 1. For purposes of clarity these counter shafts and drive shaft 1 are shown in a common vertical plane in Fig. 1. Counter shaft 7 has its ends fixedly supported in a front wall portion 8 and in an inner wall portion 9 of the transmission housing 2. Rotatably mounted about counter shaft 7 on bearing 12 is a reverse idler 13 constantly in mesh with spur gear section 3. The second counter shaft 11 is rotatably supported at its ends in ball bearings 16 and 17 mounted in the transmission housing. At opposite ends of counter shaft 11 and spline connected for rotation therewith are two counter gears 18 and 19. Counter gear 18 is constantly in mesh with reverse idler 13, so that rotation of drive shaft 1 results in rotation of reverse idler 13, counter gear 18, counter shaft 11 and counter gear 19.

Axially aligned with and to the rear of driving shaft 1 is a transmission input shaft 21 rotatably mounted in an inner wall 41 of the transmission housing 2 by means of a ball bearing 22. Splined on the forward end of the input shaft 21 is a sleeve 25 having a circumferential series of elongated clutch teeth 23 and a radially reduced journal portion 29. A driven ring gear 24 having a circumferential series of external clutch teeth 26 is rotatably mounted on journal portion 29. Ring gear 24 is constantly in mesh with counter gear 19 mounted on counter shaft 11.

A shiftable clutch collar 27 containing an annular groove 28 is slidably mounted on clutch teeth 23, and can be moved either forwardly to engage clutch teeth 4 of sleeve 5, or rearwardly to engage clutch teeth 26 of ring gear 24. This can be done by any suitable lever mechanism (not shown) engaging annular groove 28.

From the foregoing, it will be apparent that ring gear 24 will be driven constantly by drive shaft 1 through spur gear 3, reverse idler 13, counter gear 18, countershaft 11, and counter gear 19. Shifting of the clutch collar 27 to engage clutch teeth 4 of sleeve 5 will cause input shaft 21 to rotate in the same direction as drive shaft 1, whereas shifting of collar 27 to engage clutch teeth 26 of ring gear 24 will cause input shaft 21 to rotate in the opposite direction and at approximately the same rate of speed as that of the drive shaft 1.

The quick shift, variable ratio transmission gearing as seen in Fig. 1 comprises, in general, two rearwardly located planetary gear trains; a forwardly located double friction clutch assembly supplying selective input to the planetary gear trains; and selectively operable brakes for the reaction elements of the planetary gear trains. The planetary transmission is disposed within a rear transmission compartment and the double friction clutch is disposed within an intermediate clutch compartment.

Referring to Fig. 1, integrally formed with the input shaft 21 to the rear of the inner housing wall 41 is a clutch support flange 46. Riveted to flange 46 by rivets 47 is an inner clutch drum assembly comprising a radial wall 48, a peripheral wall 49 welded to the outer edge of wall 48, and an annular backing plate 51 secured to the peripheral wall 49 in radially inward projection relation to the latter by screws 52. Slidably mounted for axial back and forth movement on the peripheral wall 49 of the inner clutch drum is a radially outer clutch cylinder or annular element 53. Tongue portions 54 of backing plate 51 extend into slots 56 formed in the clutch cylinder 53, so that the latter rotates in unison with the inner clutch drum assembly 48, 49, 51.

Extending radially inward from the peripheral wall 49 of the inner clutch drum assembly are a pair of annular front clutch friction disks 57 which rotate with the inner clutch drum assembly by reason of tongue portions 58 of disks 57 extending into axial grooves 59 of the inner side of peripheral wall 49. A similar pair of rear clutch friction disks 61 extend inwardly from clutch cylinder 53 with tongue portions 62 of disks 61 extending into slots 56 of clutch cylinder 53. Interposed between front clutch friction disks 57 and backing plate 51, and between rear clutch friction disks 61 and backing plate 51 are front driven clutch plates 63 and rear driven clutch plates 64, respectively. Front driven clutch plates 63 are slidably secured to a hub 66 splined to a rotatably mounted inner quill shaft 67. Similarly, rear driven clutch plates 64 are slidably secured to a hub 71 splined to a rotatably mounted outer quill shaft 72. These intermediate shafts 67 and 72 are coaxial relative to one another and are in axial alignment with the drive shaft 1.

As shown in Fig. 1, clutch cylinder 53 has inner front and rear snap rings 81 and 82 secured to it at axially opposite ends, respectively. These snap rings are placed a sufficient axial distance apart to allow outer clutch cylinder 53 a limited amount of axial sliding movement relative to the peripheral inner drum wall 49, backing plate 51, and rear clutch friction disks 61, all contained within the space bounded by the snap rings 81, 82. Movement of outer clutch cylinder 53 to the left in Fig. 1 forces snap ring 82 against rear friction disks 61, clamping rear clutch plates 64 between backing plate 51 and rear friction disks 61; while movement of outer clutch cylinder 53 to the right in Fig. 1 releases rear clutch plates 64 from backing plate 51 and rear friction disks 61.

Within the inner clutch drum assembly 48, 49, 51 an annular clutch piston 83 is rotatably mounted about input shaft 21 and has a limited amount of axial sliding movement toward and away from inner drum radial wall 48. Movement of clutch piston 83 to the right in Fig. 1 clamps front clutch plates 63 between front clutch friction disks 57 and backing plate 51, while movement of clutch piston 83 to the left releases the front clutch.

For releasing rear clutch plates 64 from engagement between backing plate 51 and rear friction disks 61, a conical spring washer 74, commonly known as a Belleville washer, is mounted on input shaft 21 with its annular outer edge flexibly sealed between snap ring 81 and a shoulder 76 of outer clutch cylinder 53. As shown in Fig. 1, the rear clutch is disengaged and the spring washer 74 is in a preloaded condition, that is, in the condition of the mechanism which is illustrated by Fig. 1, the Belleville washer 74 tends to increase its conicity by axial movement of its annular outer edge adjacent snap ring 81 toward the right with respect to its annular inner edge adjacent shaft 21. The inner edge of washer 74 is restrained from movement to the left along input shaft 21 by a snap ring 84 secured around input shaft 21. As the outer edge of washer 74 bears against snap ring 81 and tends to move to the right with respect to its inner edge, outer clutch cylinder 53 is constantly urged to the right in Fig. 1. When the rear clutch 64, 51 is disengaged, washer 74 urges outer clutch cylinder 53 to its right limit position, determined by the outer edge of washer 74 engaging radial wall 48, and rear clutch plates 64 can freely rotate with respect to backing plate 51 and rear clutch friction disks 61.

Another Belleville washer 86 is positioned within the inner clutch drum assembly 48, 49, 51 in a preloaded condition so that, as viewed in Fig. 1, its outer edge tends to move toward the left with respect to its inner edge. The inner edge is restrained from movement to the right along input shaft 21 by a snap ring 87 secured to input shaft 21. The outer edge of washer 86 bears against clutch piston 83 constantly urging clutch piston 83 forwardly, that is, to the left in Fig. 1. When the front clutch 63, 51 is disengaged, washer 86 will urge clutch piston 83 to its left limit position, determined by engagement of piston 83 with inner drum radial wall 48, and front clutch plates 63 can freely rotate with respect to backing plate 51 and front clutch friction disks 57.

Hydraulic pressure fluid is utilized for engaging the described front and rear clutch assemblies. To that end, a bearing retainer 91 which is fastened to the inner housing wall 41 contains a pair of drilled passages 92 and 93 communicating with a pair of passages 97 and 98 in transmission wall 41, and with a pair of circumferentially milled annular grooves 34 and 36, respectively, in input shaft 21. A passage 94 in input shaft 21 connects annular groove 34 with a chamber 102 between spring washer 74 and inner drum radial wall 48. A second passage 96 in input shaft 21 connects annular groove 36 with a chamber 101 between inner drum radial wall 48 and clutch piston 83. Fitted about input shaft 21 between the bearing retainer 91 and input shaft 21 are three metal sealing rings 37, 38 and 39. Ring 37 is fixed in front of and adjacent the forward edge of annular groove 34, ring 38 is fixed between the rear edge of annular groove 34 and the forward edge of annular groove 36, and ring 39 is fixed to the rear of and adjacent the rear edge of annular groove 36. These rings provide substantially leak free connections between passages 92 and 93 and annular grooves 34 and 36, respectively.

When pressure fluid from any suitable source is admitted through passages 98, 93 and 96 to chamber 101, clutch piston 83 is forced to the right as seen in Fig. 1, clamping front clutch plates 63 between front friction disks 57 and backing plate 51 so that quill shaft 67 will rotate with the inner clutch drum assembly 48, 49, 51 and outer clutch cylinder 53, and input shaft 21. Admitting pressure fluid through passages 97, 92 and 94 to chamber 102 flattens resilient washer 74 and forces outer clutch cylinder 53 to the left in Fig. 1. Snap ring 82 will then bear against rearmost clutch friction disk 61 clamping rear clutch plates 64 between friction disks 61 and backing plate 51 so that quill shaft 72 will rotate with the inner clutch drum assembly 48, 49, 51 and outer clutch cylinder 53, and input shaft 21.

O rings 103 and 104 are placed between the outer edge of spring washer 74 and shoulder 76 of outer clutch cylinder 53, and between the inner edge of spring washer 74 and inner drum radial wall 48, respectively, to check oil leakage around the edges of washer 74. Any conventional valve system (not shown) may be used to control admission and emission of pressure fluid through passages 97 and 98 so as to engage either clutch while leaving the other disengaged or so as to engage both clutches simultaneously.

Referring again to input shaft 21, the rear end of this shaft is piloted by a needle bearing 109 in a rotatable, axially aligned output shaft 106 mounted at the rear of the transmission housing in bearings 107 and 108. A double planetary gear system provides a driving connection at different speed ratios between the input shaft 21 and the output shaft 106.

Figure 2:
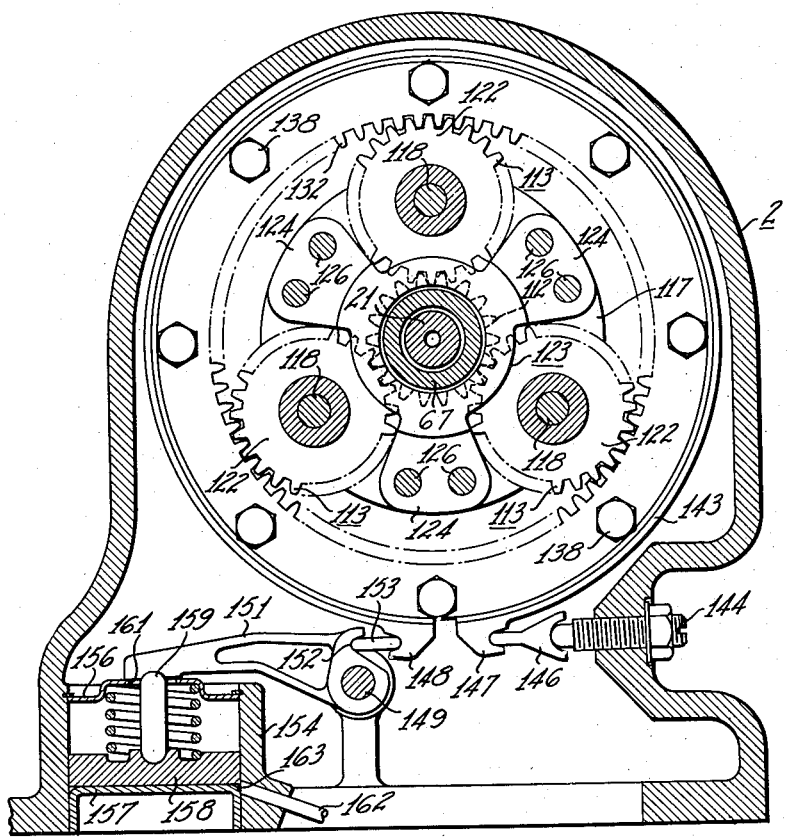
Fig. 2 is a vertical transverse section taken along the line II—II of Fig. 1 showing the arrangement of planetary gears and one of the hydraulic brake mechanisms in the transmission.

Quill shaft 72 has integrally formed at its rear end a sun gear 111, and quill shaft 67 has integrally formed at its rear end a smaller sun gear 112. In mesh with these sun gears and rotatably supported upon a planet carrier 114 are three planet clusters or double section planet pinions 113 at 120° spacings from each other as shown in Fig. 2. Each planet pinion has a front section 121 meshing with sun gear 111, and an integrally formed rear section 122 meshing with sun gear 112. Planet carrier 114 is spline connected with the output shaft 106 at the forward end of the latter and comprises two oppositely disposed radial walls 116 and 117 fastened together by bolts 126 and nuts 127. Pins 118 extend between walls 116 and 117 for rotatably supporting planet pinions 113.

Sun gears 111 and 112 may be of ordinary spur gear type, but preferably helical type gears are used to reduce gear noise. When helical type gears are used, a certain amount of axial thrust upon the sun gears is introduced. To prevent this axial thrust from clamping both sun gears together for simultaneous rotation, a sun gear separator 123 is placed between the sun gears with radially outer end portions fixed to the planet carrier. Referring to Figs. 1 and 2, sun gear separator 123 has integrally formed with it three arms 124 which extend radially outward in the peripheral spaces between the planet pinions and are bent to bear axially against the inner side of the carrier wall 117. The bolts 126 which hold the two carrier walls 116, 117 together also extend through the arms 124 so as to secure the separator 123 in place.

Planet sections 121 mesh with gear teeth on the inner periphery of a front annulus gear 131, and planet sections 122 mesh with gear teeth on the inner periphery of a rear annulus gear 132. Annulus gear 131 is securely fastened by screws 133 to a front brake drum 134 rotatably mounted on a central hub sleeve of a radial partition plate 136 detachably fastened to the transmission housing by a snap ring 135 and by screws 137. Annulus gear 132 is securely fastened by screws 138 to a rear brake drum 139 rotatably mounted on a hub sleeve 141 of planet carrier wall 117. Brake bands 142 and 143 are wrapped around front brake drum 134 and rear brake drum 139, respectively.

As both brakes are actuated in the same manner, only the brake actuating assembly for rear brake band 143 will be described. Referring to Figs. 1 and 2, the brake band 143 in flexed around brake drum 139 and tends to expand radially away from the latter. As a result, the rear brake will tend to assume the released condition in which it is shown in Fig. 2. For mounting the brake band, an adjustable brake anchor screw 144 is provided which projects inwardly from the transmission housing 2 against a strut 146. The strut 146 bears against a notched lug 147 fixed to the anchored end of brake band 143. The movable end of brake band 143 has a similar notched lug 148. Pivotally mounted about a pin 149 is a brake actuating lever 151 containing a notch 152. A strut 153 has its opposite ends seated in the notch of lug 148 and in notch 152 of lever 151. Clockwise rotation of lever 151, as viewed in Fig. 2, will force the opposite ends of brake band 143 together, tightening brake band 143 about drum 139.

A brake cylinder 154 with end plates 156 and 157 slidably contains a brake piston 158. A loosely fitted piston rod 159 sits on brake piston 158 and is guided by a slot 161 in end plate 156 to bear against brake actuating lever 151. Pressure fluid from any suitable source enters the brake cylinder through a passage 162 leading to an annular crevice 163 between the piston 158 and end plate 157. Upward movement in Fig. 2 of piston 158 is transmitted through rod 159 to lever 151 causing clockwise rotation of the lever about pin 149 and consequent engagement of brake band 143 with brake drum 139.

The foregoing explanations with reference to the construction and operation of the rear brake 143, 139 similarly apply to the front brake 142, 134.

Any conventional control means (not shown) is used to selectively engage either brake 142, 134 or brake 143, 139 by providing an inlet or exhaust connection for hydraulic fluid to or from the individual brake actuating mechanisms.

The herein disclosed transmission provides five selectable speed ratios any one of which is available for either forward or reverse drive. Figs. 4, 5, 6, 7 and 8 show, by a heavy line, the flow of power through the planetary gearing and associated clutches for each speed ratio, neglecting the forward and reverse gearing between driving shaft 1 and transmission input shaft 21 shown in the left part of Fig. 1.

Figure 4:
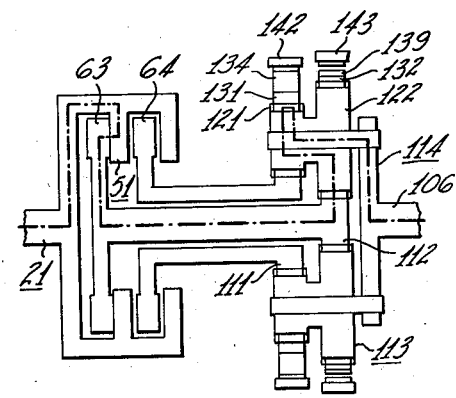
Figs. 4, 5, 6, 7 and 8 are diagrammatic drawings of the transmission showing the power flow through the transmission for each of five available speed ratios.

Low or first speed is shown in Fig. 4. Front clutch 63, 51 and front brake 142, 134 are engaged, and rear clutch 64, 51 and rear brake 143, 139 are disengaged. Rear sun gear 112 rotates in unison with transmission input shaft 21, and front sections 121 of the planet pinions 113 roll on braked annulus gear 131. As a result, planet carrier 114 and output shaft 106 rotate in the same direction as but at a slower speed than input shaft 21.

Figure 5:
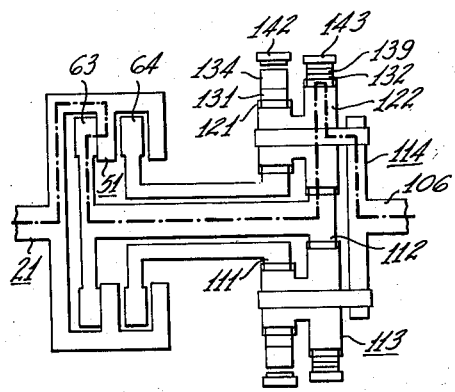

Second speed is shown in Fig. 5. Front clutch 63, 51 and rear brake 143, 139 are engaged and rear clutch 64, 51 and front brake 142, 134 are disengaged. Rear sun gear 112 rotates in unison with transmission input shaft 21 and rear sections 122 of planet pinions 113 roll on braked annulus gear 132. As a result, planet carrier 114 and output shaft 106 will rotate in the same direction as but at a slower speed than input shaft 21, the speed ratio between the input and output shafts now being higher than when the transmission is in low gear.

Figure 6:
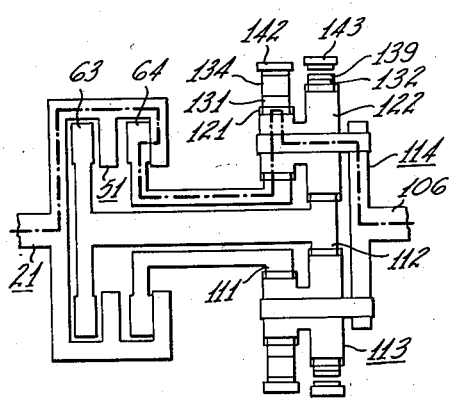

Third speed is shown in Fig. 6. Rear clutch 64, 51 and front brake 142, 134 are engaged and front clutch 63, 51 and rear brake 143, 139 are disengaged. Front sun gear 111 rotates in unison with input shaft 21 and front sections 121 of the planet pinions 113 roll on braked annulus gear 131. As a result, planet carrier 114 and output shaft 106 rotate in the same direction as but at a slower speed than input shaft 21, the speed ratio between the input and output shafts now being higher than when the transmission is in second gear.

Figure 7:
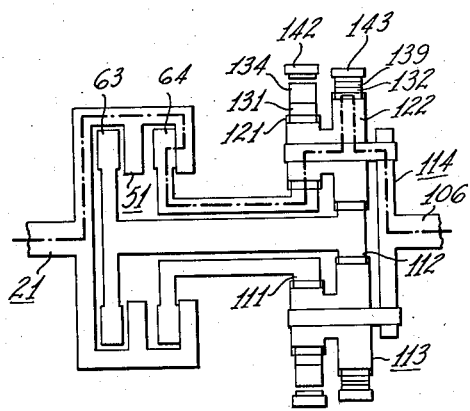

Fourth speed is shown in Fig. 7. Rear clutch 64, 51 and rear brake 143, 139 are engaged and front clutch 63, 51 and front brake 142, 134 are disengaged. Front sun gear 111 rotates in unison with input shaft 21 and rear sections 122 of planet pinions 113 roll on braked rear annulus gear 132. As a result, planet carrier 114 and output shaft 106 rotate in the same direction as but at a slower speed than input shaft 21, the speed ratio between the input and output shafts now being higher than when the transmission is in third gear.

Figure 8:
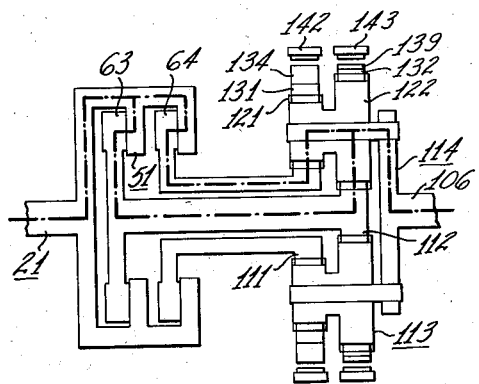

Fifth speed, or direct drive, is shown in Fig. 8. Both clutches 63, 51 and 64, 51 are engaged and both brakes 142, 134 and 143, 139 are disengaged. Both sun gears 111 and 112 rotate in unison with the input shaft, the planet pinions 113 are unable to rotate relative to the carrier 114. As a result, the carrier 114, output shaft 106, and annulus gears 131, 132 rotate as a unit in the same direction and at the same speed as the input shaft 21.

The gear ratios in the first four speeds indicated above are all less than one to one, and are determined by the fixed transmission ratios which exist between the sun gear 111 and the carrier 114, and between the sun gear 112 and the carrier 114, when either of the annulus gears 131, 132 is at rest while the other is free to rotate.

Adjustment of the transmission for forward or reverse drive is accomplished by means of clutch collar 27 already described. The transmission input shaft 21 rotates in the same direction as drive shaft 1 when clutch collar 27 is in the position shown in Fig. 1 in which it engages clutch teeth 4 of spur gear 3. The hereinbefore described five gear ratios become available for reverse drive when clutch collar 27 is shifted into engagement with clutch teeth 26 of ring gear 24, and power transmission is from the drive shaft 1 through reverse idler 13, counter shaft 11, and ring gear 24. The reverse gear train 3, 13, 18, 19, 24 may be proportioned to afford a gear ratio which is equal to unity, or if the reverse speeds are desired to be slower than the corresponding forward speeds, the ratio of the reverse gear train may be made larger than unity.

A neutral condition is readily obtained by appropriate control of clutches 63, 51 and 64, 51, and/or brakes 142 and 143. For instance, both clutches may be disengaged so that no power will be transmitted to the output shaft 106. In this manner, motion of a vehicle equipped with this transmission can readily be stopped by the manipulation of the fluid control means used for the clutches in the transmission without the need of disengaging an engine clutch. In operations where many sudden and unexpected stops are likely to be necessary, this arrangement adds considerably to the ease in handling the vehicle.

It will be noted that the highest speed in this transmission in either direction is obtained by locking up the operating parts of the planetary system so that the entire planetary rotates as a unit. For this reason, wear of the transmission is minimized as no load is transmitted through relatively moving parts in the planetary gearing at high speeds when wear is most likely to occur.

The present invention has particular utility when installed in an industrial or farm type vehicle. Gear ratio changes when traveling in a given direction are all made by selective operation of clutches and brakes within the transmission and for this reason are made smoothly and quickly. An operator need not throttle down and risk stalling his engine when he desires to turn or start an operation requiring momentarily a slower vehicle speed, as he may obtain this speed easily by selecting a lower speed ratio in the transmission. This advantage of having a large number of speed ratios available for different operating conditions exists regardless of whether the operator is traveling in forward or reverse.

The above advantages are obtained with a minimum number of brakes, clutches and planetary gear parts. In this way, the weight and bulk of the transmission is reduced. This is of considerable importance in the design of a transmission for a smaller type vehicle which, because of the type of work it performs, should be capable of being driven at many different speeds.

While I have described one particular embodiment of my invention, it should be understood that I do not wish to be restricted thereto and that I intend to cover all modifications of the invention which would be apparent to one skilled in the art and that come within the scope of the appended claims.

It is claimed and desired to secure by Letters Patent:

1. A quick shift, variable ratio power transmitting device comprising: a transmission input shaft; an output shaft disposed at the rear of and coaxial with said transmission input shaft, a planetary transmission unit disposed coaxial with and between said transmission input and output shafts, said unit including a planet carrier secured for rotation with said output shaft, a plurality of planet clusters rotatably mounted on said carrier and each including a pair of gear sections, a pair of selectively breakable annular gears meshing, respectively, with said gear sections, a pair of coaxial intermediate shafts coaxially aligned with and extending forwardly of said unit and sun gears nonrotatably secured, respectively, to the rear ends of said intermediate shafts for meshing, respectively, with said gear sections; and a selectively engageable and disengageable friction clutch for each of said intermediate shafts operatively interposed between said transmission input shaft and the associated intermediate shaft.

2. A quick shift, variable ratio power transmitting device comprising: a transmission input shaft; an output shaft disposed at the rear of and coaxial with said transmission input shaft; a double input single output planetary transmission unit disposed coaxial with and between said transmission input and output shafts, said unit including a planet carrier secured for rotation with said output shaft, a plurality of planet clusters rotatably mounted on said carrier and each including a pair of gear sections, a pair of selectively breakable annulus gears meshing, respectively, with said gear sections, a pair of coaxial intermediate shafts coaxially aligned with and extending forwardly of said unit and sun gears nonrotatably secured, respectively, to the rear ends of said intermediate shafts for meshing, respectively, with said gear sections; and a double friction clutch disposed between said unit and said transmission input shaft, said friction clutch being selectively operable to connect said transmission input shaft in power transmitting relation to both of said intermediate shafts, to one of said intermediate shafts and to the other of said intermediate shafts.

3. A quick shift, variable ratio power transmitting device comprising: a transmission housing having a clutch compartment and a rear transmission compartment; a transmission input shaft extending into said transmission housing; a pair of coaxial intermediate shafts having forward ends extending into said clutch compartment and rearward ends extending into said rear transmission compartment, one of said intermediate shafts being a quill shaft surrounding the other of said intermediate shafts; a double friction clutch within said clutch compartment operatively interposed between said transmission input shaft and said forward ends of said intermediate shafts, said clutch being operable to selectively connect either or both of said intermediate shafts to said transmission input shaft; a pair of sun gears secured for rotation, respectively, with the rearward ends of said intermediate shafts; an output shaft having a forward end extending into said rear transmission compartment and having a rearward end extending beyond the rear of said rear transmission compartment; and a planetary transmission unit disposed within said rear transmission compartment including a planet carrier connected to the forward end of said output shaft for rotation therewith, a plurality of planet clusters mounted on said carrier and each having a pair of rigidly interconnected gear sections meshing, respectively, with said sun gears, a pair of annulus gears in mesh, respectively, with said gear sections, and brake means selectively operable to secure said annulus gears against rotation relative to said rear transmission compartment.

References Cited in the file of this patent

UNITED STATES PATENTS

| | | |
|---|---|---|
| 894,473 | Symmonds | July 28, 1908 |
| 2,697,367 | Winther | Dec. 21, 1954 |
| 2,697,368 | Winther et al. | Dec. 21, 1954 |

FOREIGN PATENTS

| | | |
|---|---|---|
| 43,574 | France | Apr. 23, 1934 |
| 1,019,050 | France | Oct. 22, 1952 |
| 150,356 | Germany | Apr. 13, 1904 |
| 19,499 | Great Britain | Aug. 25, 1910 |
| 602,803 | Great Britain | June 3, 1948 |
| 448,547 | Italy | May 19, 1949 |